(12) United States Patent
Dudley et al.

(10) Patent No.: US 11,975,566 B2
(45) Date of Patent: May 7, 2024

(54) TWO PIECE WHEEL

(71) Applicant: Vision Composite Products, LLC, Decatur, AL (US)

(72) Inventors: Alan Dudley, Somerville, AL (US); John P. Mathew, Madison, AL (US); Nick Hall, Madison, AL (US)

(73) Assignee: Vision Composite Products, LLC, Decatur, AL (US)

( * ) Notice: Subject to any disclaimer, the term of this patent is extended or adjusted under 35 U.S.C. 154(b) by 39 days.

(21) Appl. No.: 16/637,103

(22) PCT Filed: Aug. 8, 2018

(86) PCT No.: PCT/US2018/045744
§ 371 (c)(1),
(2) Date: Feb. 6, 2020

(87) PCT Pub. No.: WO2019/032664
PCT Pub. Date: Feb. 14, 2019

(65) Prior Publication Data
US 2020/0247182 A1  Aug. 6, 2020

Related U.S. Application Data (60) Provisional application No. 62/542,520, filed on Aug. 8, 2017.

(51) Int. Cl.
*B60B 25/00* (2006.01)
*B60B 3/04* (2006.01)

(52) U.S. Cl.
CPC ............ *B60B 25/004* (2013.01); *B60B 3/041* (2013.01); *B60B 2360/102* (2013.01);
(Continued)

(58) Field of Classification Search
CPC ....... B60B 25/002; B60B 25/004; B60B 3/04; B60B 3/041; B60B 3/042; B60B 3/044
See application file for complete search history.

(56) References Cited

U.S. PATENT DOCUMENTS

| 1,481,579 | A | * | 1/1924 | Witter | ........................ | B60B 3/04 |
| | | | | | | 152/47 |
| RE17,589 | E | * | 2/1930 | Swain | ....................... | B60B 3/04 |
| | | | | | | 301/9.1 |

(Continued)

FOREIGN PATENT DOCUMENTS

DE  19860732 A1  7/2000
DE  102011120361 A1  6/2013
(Continued)

OTHER PUBLICATIONS

Examination Report for application serial No. AU 2018313812 dated Aug. 3, 2021.
(Continued)

*Primary Examiner* — Jason R Bellinger
(74) *Attorney, Agent, or Firm* — Bradley Arant Boult Cummings LLP; Ryan Letson (57) ABSTRACT

A two-piece wheel may have a first section and a second section. The wheel has areas of varying diameter across its width, and the first section and second section are joined at the area of the wheel with the smallest diameter. The first section can be a spoke section with spokes extending from a central hub and the second section can be a barrel section.

20 Claims, 6 Drawing Sheets

(52) U.S. Cl.
CPC . *B60B 2360/104* (2013.01); *B60B 2360/3412* (2013.01); *B60B 2360/3416* (2013.01)

(56) References Cited

U.S. PATENT DOCUMENTS

| | | | | |
|---|---|---|---|---|
| 1,821,663 | A * | 9/1931 | Murray, Jr. | B60B 3/04 301/19 |
| 1,924,970 | A * | 8/1933 | Ash | B60B 3/16 301/11.1 |
| 1,952,404 | A * | 3/1934 | Woodward | B60B 3/04 29/894.323 |
| 1,959,754 | A * | 5/1934 | Zipper | B60B 3/04 301/65 |
| 2,105,317 | A * | 1/1938 | Frank | B60B 3/08 301/6.2 |
| 2,145,377 | A * | 1/1939 | Sinclair | B60B 3/04 301/35.59 |
| 2,379,277 | A | 12/1942 | Burger | |
| 2,566,663 | A * | 9/1951 | Hollerith | B60B 25/002 301/6.7 |
| 2,805,894 | A * | 9/1957 | Gilbert | B60B 3/044 301/55 |
| 2,992,857 | A * | 7/1961 | Lemmerz | B21D 53/26 301/63.101 |
| 3,117,369 | A * | 1/1964 | Werner | B60B 3/04 29/894.322 |
| 3,369,843 | A | 2/1968 | Prew | |
| 4,072,358 | A | 2/1978 | Ridha | |
| 4,294,490 | A | 10/1981 | Woelfel | |
| 4,294,639 | A | 10/1981 | Woelfel et al. | |
| 4,376,749 | A | 3/1983 | Woelfel | |
| 4,514,013 | A | 4/1985 | Woelfel et al. | |
| 4,532,097 | A | 7/1985 | Daniels et al. | |
| 4,583,933 | A | 4/1986 | Woelfel et al. | |
| 4,636,344 | A | 1/1987 | McDougall | |
| 4,721,342 | A | 1/1988 | Daniels et al. | |
| 4,749,235 | A | 6/1988 | McDougall | |
| RE32,949 | E | 6/1989 | Woelfel et al. | |
| 4,927,347 | A | 5/1990 | Golata et al. | |
| 5,045,261 | A | 9/1991 | Weeks | |
| 5,234,259 | A | 8/1993 | Nishimuro et al. | |
| 5,282,673 | A | 2/1994 | Koyama et al. | |
| 5,344,219 | A | 9/1994 | Adrian et al. | |
| 5,826,948 | A | 10/1998 | Schroeder et al. | |
| 6,033,612 | A | 3/2000 | Adams et al. | |
| 6,045,196 | A | 4/2000 | Mason | |
| 6,068,350 | A | 5/2000 | Baumgarten et al. | |
| 6,547,341 | B1 * | 4/2003 | Griffin | B60B 3/02 29/894.322 |
| 6,726,292 | B1 | 4/2004 | Schroeder et al. | |
| 7,040,714 | B2 | 5/2006 | Schroeder et al. | |
| 7,361,296 | B2 | 4/2008 | Adrian | |
| 7,537,034 | B2 * | 5/2009 | Zabaleta | B60B 3/002 152/396 |
| 7,615,171 | B2 | 11/2009 | Schroeder et al. | |
| 7,918,513 | B2 | 4/2011 | Wilson | |
| 9,259,882 | B2 | 2/2016 | Lim et al. | |
| 9,302,535 | B2 | 4/2016 | Goto | |
| 9,789,729 | B2 * | 10/2017 | Anderson | B60B 23/06 |
| 2003/0080609 | A1 | 5/2003 | Darnell | |
| 2005/0104441 | A1 | 5/2005 | Bertelson | |
| 2005/0269866 | A1 | 12/2005 | McGoon, IV | |
| 2011/0140507 | A1 * | 6/2011 | Anca | B60B 23/10 301/64.101 |
| 2012/0043014 | A1 | 2/2012 | Lim et al. | |
| 2012/0146395 | A1 | 6/2012 | Silva et al. | |
| 2012/0235465 | A1 | 9/2012 | Kuttner et al. | |
| 2013/0049443 | A1 | 2/2013 | Heß et al. | |
| 2013/0221555 | A1 | 8/2013 | Radtke et al. | |
| 2013/0221731 | A1 | 8/2013 | Hess et al. | |
| 2014/0333122 | A1 | 11/2014 | Werner et al. | |
| 2015/0130261 | A1 | 5/2015 | Warren | |
| 2015/0231917 | A1 | 8/2015 | Dressler et al. | |
| 2016/0303904 | A1 | 10/2016 | Kendricks | |
| 2016/0325582 | A1 * | 11/2016 | Werner | B60B 21/12 |

FOREIGN PATENT DOCUMENTS

| | | | | |
|---|---|---|---|---|
| DE | 102013114343 A1 | 7/2015 | | |
| EP | 0854792 B1 | 7/1998 | | |
| EP | 1582377 A1 * | 10/2005 | | B60B 3/16 |
| FR | 2580550 A1 | 10/1986 | | |
| JP | 2011/143866 A | 7/2011 | | |
| WO | WO-9719823 A1 * | 6/1997 | | B60B 3/005 |
| WO | 2013/160997 A1 | 10/2013 | | |
| WO | 2013187418 A1 | 12/2013 | | |
| WO | 2014016211 A1 | 1/2014 | | |
| WO | 2014072151 A1 | 5/2014 | | |
| WO | 2015137463 A1 | 9/2015 | | |
| WO | 2016066769 A1 | 5/2016 | | |
| WO | 2016097627 A1 | 6/2016 | | |
| WO | 2017160795 A1 | 9/2017 | | |

OTHER PUBLICATIONS

Examination Report for application serial No. IN 202037003667 dated Jul. 30, 2021.
International Search Report and Written Opinion for International application No. PCT/US18/45744.
Extended European Search Report for application serial No. EP 18843936.8 dated Apr. 1, 2021.
AU2018313812 Examination Report dated Aug. 3, 2021 (AU2015365739A1 published as WO2016/097627).
Decision of Rejection dated Aug. 31, 2023 for application serial No. CN 201880051682.5.
Office action dated Sep. 30, 2022 for application serial No. CN 201880051682.5.
Notice of reason for rejection dated Jul. 5, 2022 for application serial No. JP2020-507037 and English translation.
Notice of Reasons for Rejection dated Feb. 7, 2023 for application serial No. JP 2020-507037 and English translation.
Decision to Refuse issued Aug. 1, 2023 for application serial No. JP 2020-507037 and English translation.
Preliminary report Apr. 27, 2022 for application serial No. BR 1120200023850.
Examination Report dated May 11, 2023 for application serial No. EP 18843936.8.
Substantive Examination for application serial No. ID P00202001114 dated Sep. 22, 2022.
Examination report No. 1 for innovation patent No. AU 2022100029 dated Aug. 15, 2022.
Examination report No. 1 for innovation patent No. AU 2023100027 dated Jun. 9, 2023.
Office action issued Mar. 7, 2024 for Mexican Patent Application MX/a/2020/000217. This document is published in Spanish and includes analysis by the Mexican patent office of Applicant's related patent application that is pending in Mexico.

* cited by examiner

TWO PIECE WHEEL

CROSS REFERENCE TO RELATED APPLICATIONS

This application claims priority to, and the benefit of U.S. Provisional Patent Application No. 62/542,520 filed on Aug. 8, 2017.

FIELD OF THE DISCLOSURE

The present disclosure relates to wheels for automobiles and other wheeled vehicles. In particular, the present disclosure relates to a two (2) piece wheel.

BACKGROUND

As is well known, consumers often want multiple choices and options when purchasing an automobile to allow them options based on look, price or some other trait (such as fuel economy). With this in mind, the present disclosure provides a novel and unique two (2) piece molded wheel that offers many benefits including reduced weight, varied appearance, reduced cost and increased fuel economy. More specifically, the present disclosure provides a wheel that minimizes the weight thereof but retains the necessary strength.

The composite wheels in the prior art are often extremely expensive due to the costs of materials involved in the manufacture thereof and the time involved to manufacture each wheel. The present disclosure provides a strong, attractive and light weight two (2) piece wheel that is cheaper and easy to manufacture.

SUMMARY OF INVENTION

In one aspect, the present disclosure provides a two (2) piece molded wheel comprising a spoke section and a barrel section, wherein the spoke section and barrel sections are joined at the drop center of the wheel.

In another aspect, the present disclosure provides a two (2) piece wheel comprising a first section and a second section wherein the wheel comprises areas of varying diameter across its width and the first section and second section are joined at the area of the wheel with the smallest diameter.

BRIEF DESCRIPTION OF THE DRAWINGS

To further illustrate the advantages and features of the present disclosure, a more particular description of the invention will be rendered by reference to specific embodiments thereof which are illustrated in the attached drawings. It is appreciated that these drawings are not to be considered limiting in scope. The invention will be described and explained with additional specificity and detail through the use of the drawings in which.

DETAILED DESCRIPTION

As shown in FIGS. 1-6, the present application provides an improved, two (2) piece wheel 10 which may be used on various automobiles, including but not limited to passenger cars and trucks. The wheel 10 disclosed herein offers many advantageous features not found in prior art wheels such as a lighter weight and stronger construction.

Figure 1:
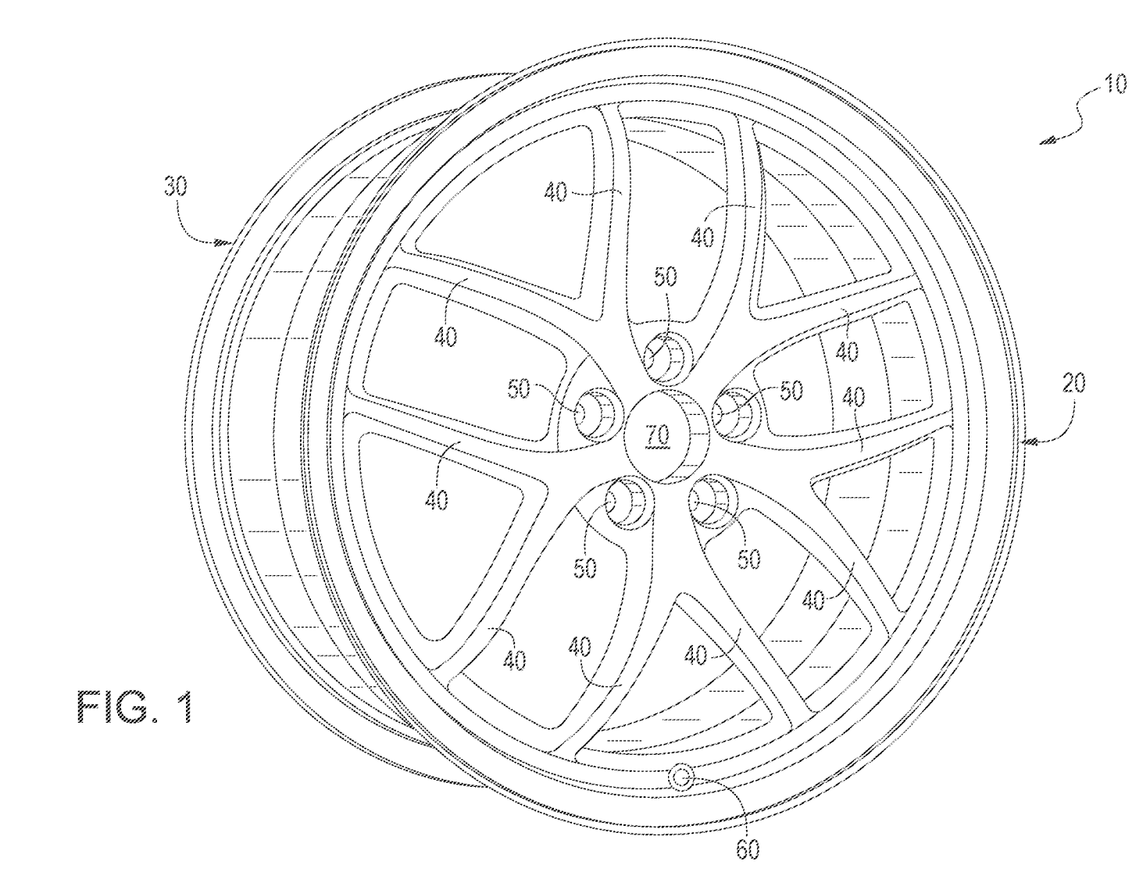
FIG. 1 shows a front view of one embodiment of the wheel of the present disclosure.
Figure 2:
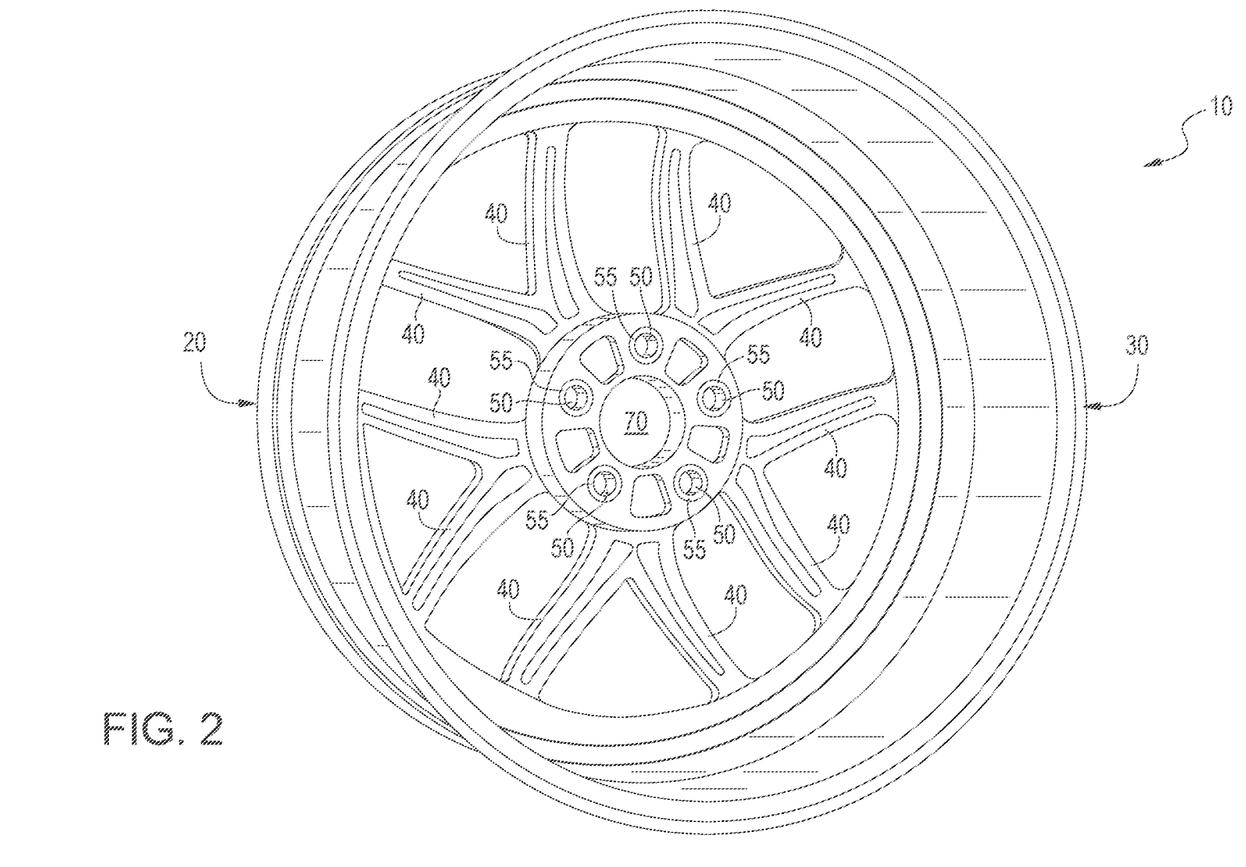
FIG. 2 shows a rear view of one embodiment of the wheel of the present disclosure.
Figure 3:
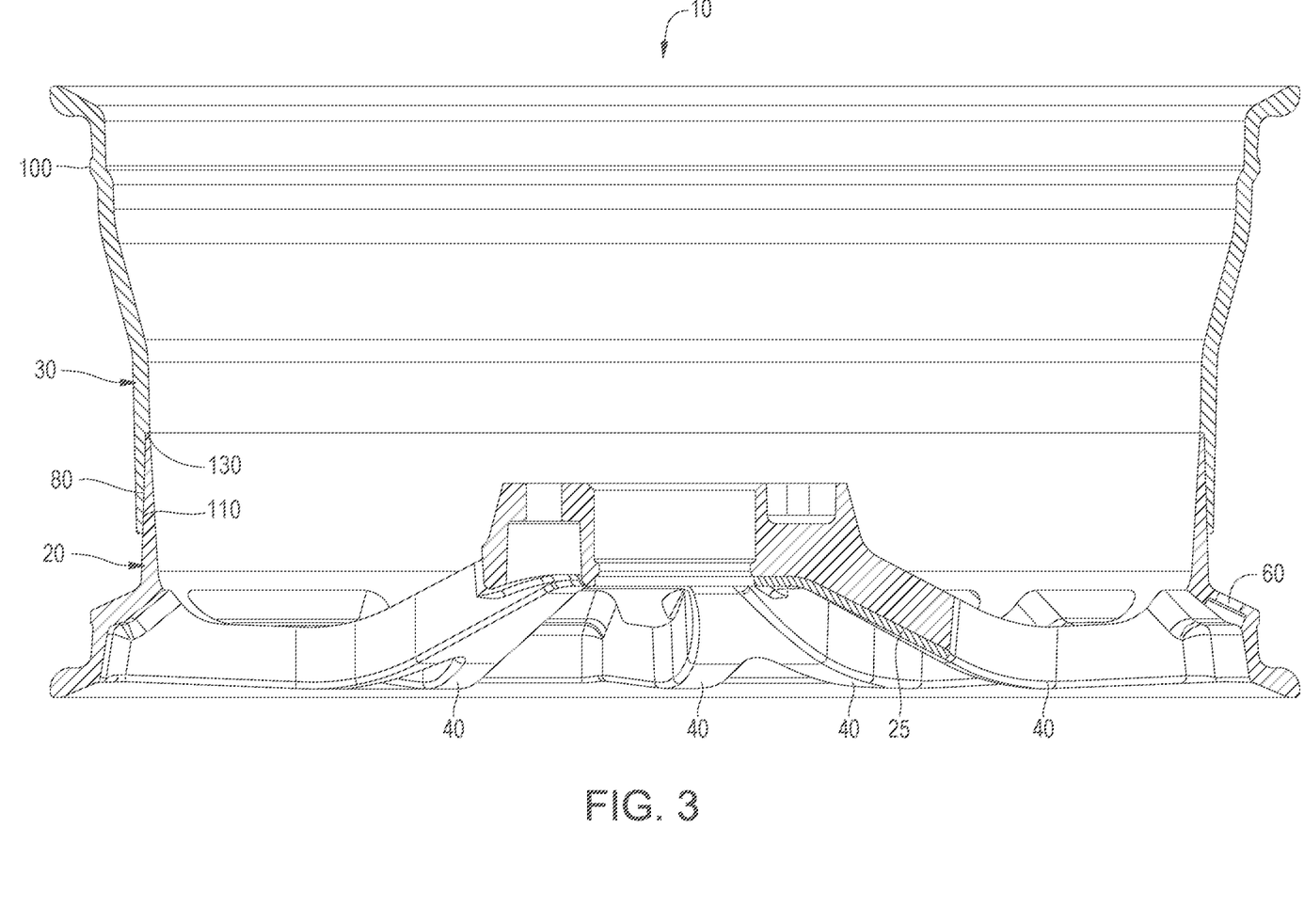
FIG. 3 shows a top sectional view of one embodiment of the wheel of the present disclosure.

FIG. 1 shows a front view of the wheel 10 fully assembled. The wheel comprises a spoke section 20 (which is furthest away from the automobile on which the wheel 10 is installed) and a barrel section 30 (which is closer to the automobile on which the wheel is installed). FIG. 2 shows a rear view of the wheel fully assembled while FIG. 3 shows a top sectional view of the fully assembled wheel 10.

The spoke section 20 includes one or more spokes 40 that both serve to add strength to the wheel 10 and also provide a pleasing decorative appearance. As such, one of ordinary skill in the art can appreciate that although one design is shown in the figures included herewith, many different spoke designs and arrangements are possible based on consumer preference and the scope of the present invention should not be limited by the design shown in the figures. Additionally, the shape, design, number and length of the spokes 40 can be varied to increase the strength of the wheel 10. The spokes section 20 and spokes 40 may also include one or more fiber composite strips 25. The fiber composite strips 25 can be either co-molded between fiber layers as the spoke section 20/spokes 40 are molded or they may be bonded to the spoke section 20/spokes 40 after those features are molded. The fiber composite strips 25, as shown in FIG. 3, may be placed along the exterior surface of one or more spokes 40 or alternatively, they may be located where the spokes 40 meet the hub or center of the spoke section, along the lip or outer edge of the spoke section or where the spokes 40 meet the barrel.

The spoke section 20 also includes a plurality of apertures near its center, including one or more wheel stud apertures 50 and a hub aperture 70. The wheel stud apertures 50 are configured to receive the threaded wheel studs (or sometimes called wheel bolts) present on the hub of the vehicle on which the wheel 10 will be installed. Accordingly, as shown in the attached figures, there may be five (5) wheel stud apertures (which is the common number on most passenger cars) but there could be more or less wheel stud apertures if needed for installation on a particular vehicle or vehicle type. For example, there could be as few as four (4) wheel stud apertures or as many as twelve (12). As shown in the attached figures, there may be a recess on the exterior of the spoke section 20 in which the lug nuts fit during installation, though this is not required. Alternatively, there may only be a single aperture on the wheel wherein the hub passes through the aperture and a nut is threaded onto the hub to secure to the wheel.

Optionally, the spoke section 20 may include one or more inserts 55 that can be generally complimentary to the shape and size of the wheel stud apertures 50. These inserts 55 may be molded integrally near the region of the spoke section 20 proximate to the wheel stud apertures 50. These inserts 55 can be of various shapes and composition. For example, the insert 55 may complement the shape and size of the wheel stud aperture 50 and form a concentric circle therewith, as shown in FIG. 2 and be placed around one or more of the wheel stud apertures 50. Alternatively, the insert 55 could be rectangular and placed proximate to the wheel stud aperture, but not of a circular shape. The insert 55 may be metal or other suitable materials to help distribute the forces imparted on the wheel 10 when the lug nuts are tightened onto the wheel studs. After the wheel studs are passed through the wheel stud apertures 50, generally one or more lug nuts or other securement device will be screwed onto the threaded wheel studs to attach the wheel 10 securely to the vehicle. The hub aperture 70 is provided such that the hub of a vehicle may pass through the spoke section 20. As one of ordinary skill in the art can appreciate, the dimensions of the hub aperture 70 will often vary due to the make and model of vehicle on which the wheel 10 is to be installed—i.e., a wheel designed to be installed on a Ford® may have a different dimensioned hub aperture 70 than a wheel designed to fit on a Subaru®.

The spoke section 20 also includes a valve stem aperture 60 which receives a valve stem which is used to add air (or other suitable gasses such as nitrogen) to the tire seated on the wheel 10.

The spoke section 20 also includes a beadhump 100 on its interior facing surface that secures the bead of the tire to the wheel 10.

The spoke section 20 also has a mating surface 80 which is in contact with the barrel surface's mating surface 110 when the wheel 10 is assembled (as discussed in more detail below).

Figure 5:
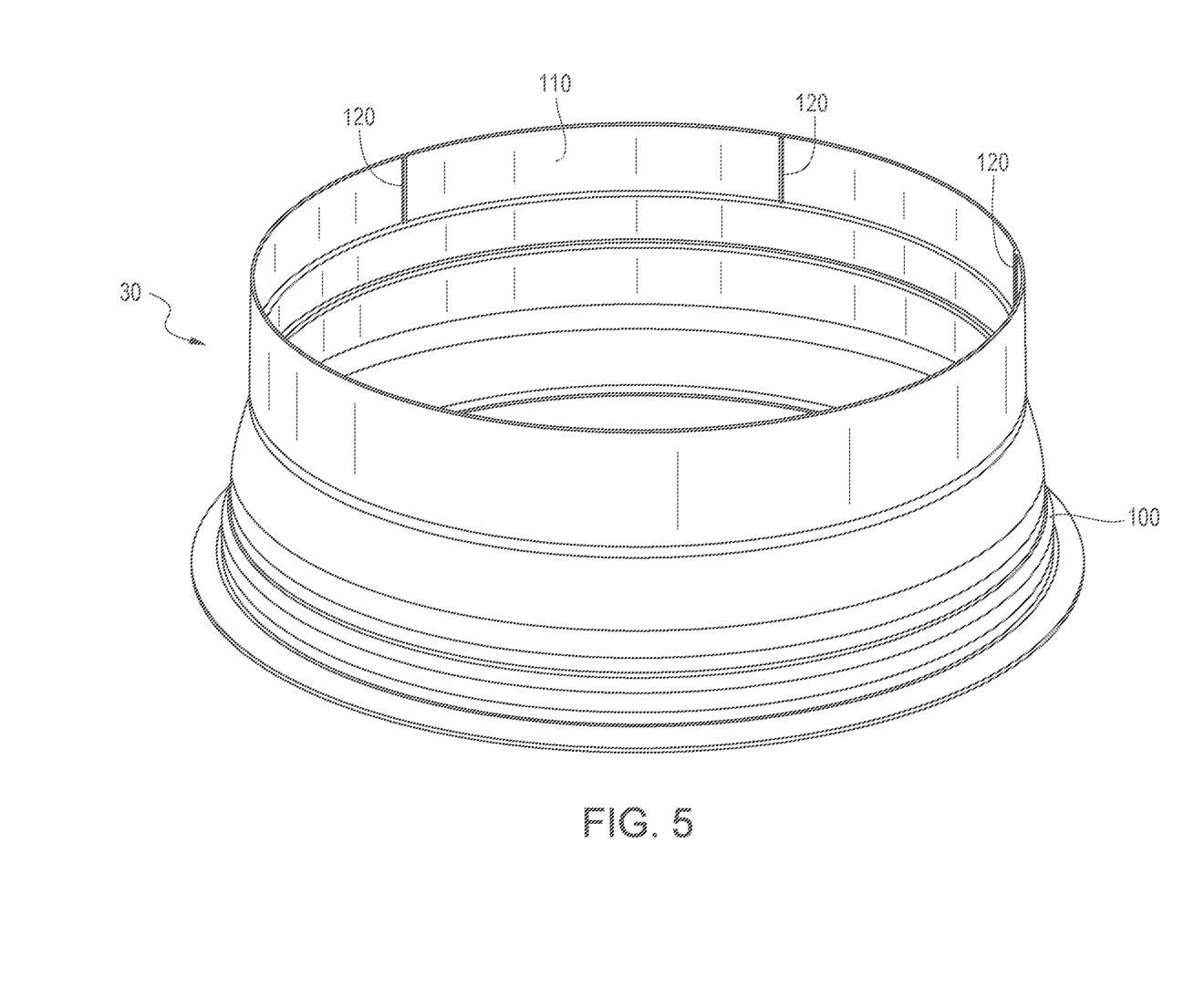
FIG. 5 shows a perspective view of one embodiment of the barrel section of the present disclosure.

The barrel section 30 is the portion of the wheel 10 closest to the automobile. The barrel section 30, like the spoke section 20, includes a beadhump 100 on its exterior facing surface that secures the bead of the tire to the wheel 10. In one embodiment, as shown in FIG. 5 for example, the barrel section 30 reduces in diameter across its width, or put another way, the inner most portion of the barrel section 30 may have a larger diameter than the outermost portion.

Figure 6:
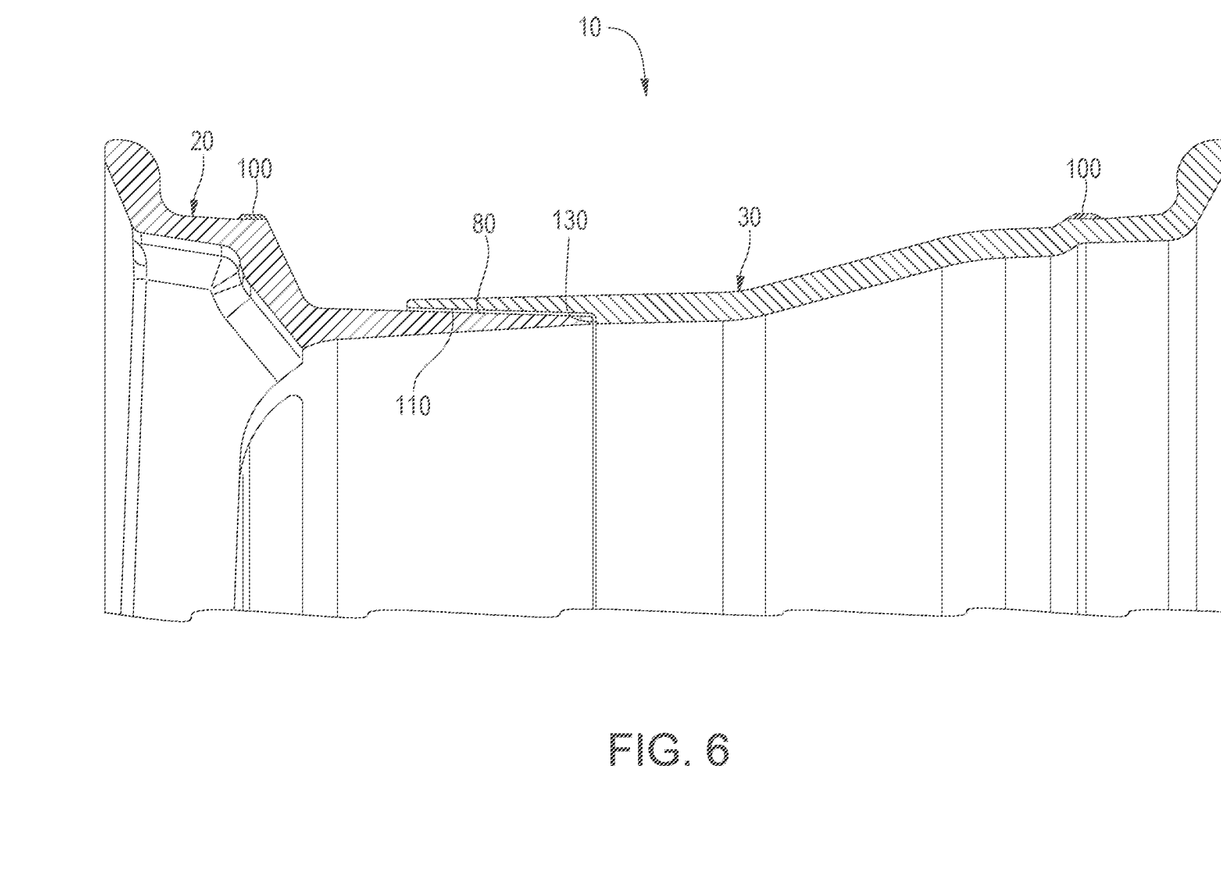
FIG. 6 shows a side view of the joining of the barrel section and spoke section.

Further, the barrel section 30 has a mating surface 110 that may be complementary to the spoke section's mating surface 80. As can be appreciated from the attached drawings, different areas of the wheel 10 have different diameters. For example, the area of the wheel with the bead hump 100 has a different diameter than the central area of the wheel 10. In one embodiment the mating surface 110 is generally located at the drop center (also known as the tire well) of the wheel 10, or the area of the wheel where it is the narrowest, and thus the opposing mating surface 80 of the spoke section 20 where the sections are joined is also located at the drop center, and the drop center of a wheel 10 makes mounting a tire easier in that it allows the tire's bead wires to retain their natural shape/length/diameter during the mounting process. The bead hump 100 may be molded or formed integrally with the spoke section 20 and barrel section 30, as shown in FIG. 5 or it may be manufactured separately and affixed or attached to the spoke section 20 and barrel section 30 as shown in FIG. 6.

The mating surface 110 of the barrel section 30 includes one or more spacers 120 which serve to provide a gap between the spoke sections 20 mating surface 80 and the barrel section's mating surface 110 after the wheel is assembled. This gap allows space for the adhesive used to join the spoke section 20 and the barrel section 30 to be applied evenly and to properly harden and attach the two sections thus creating a strong, reliable wheel 10. In one embodiment, the adhesive can be selected from the group consisting of urethane and epoxy based adhesives. In one embodiment, the spacers 120 have a height of between 5 and 60 one-thousandth's of an inch. Alternatively, the mating surface 80 of the spoke section may comprise the one or more spacers rather than the barrel section 30.

The mating surface 110 of the barrel section 30 may have a lip or stop 130 that the leading edge of the spoke section's mating surface 80 rests against once the two sections are fitted properly during assembly. This lip or stop 130 serves to provide that adequate overlap is created by the two opposing mating surfaces 80, 110 to provide for a secure assembly. The amount of overlap may vary depending upon the desired use of the wheel. In some embodiments, the amount of overlap is between 0.10 and 6.00 inches, 0.50 and 5.00 inches, 1.00 and 4.0 inches and 1.50 and 3.0 inches. In one preferred embodiment, the amount of overlap is between 1.50 and 2.00 inches.

In addition to the lap joint shown in the attached figures, the overlap region could feature a tongue-and-groove construction or threads to assist in securing the spoke section 20 to the barrel section 30. Optionally, in addition to the adhesive used to secure the spoke section 20 to the barrel section 30, mechanical securement devices such as rivets, bolts or a tape may be used.

Figure 4:
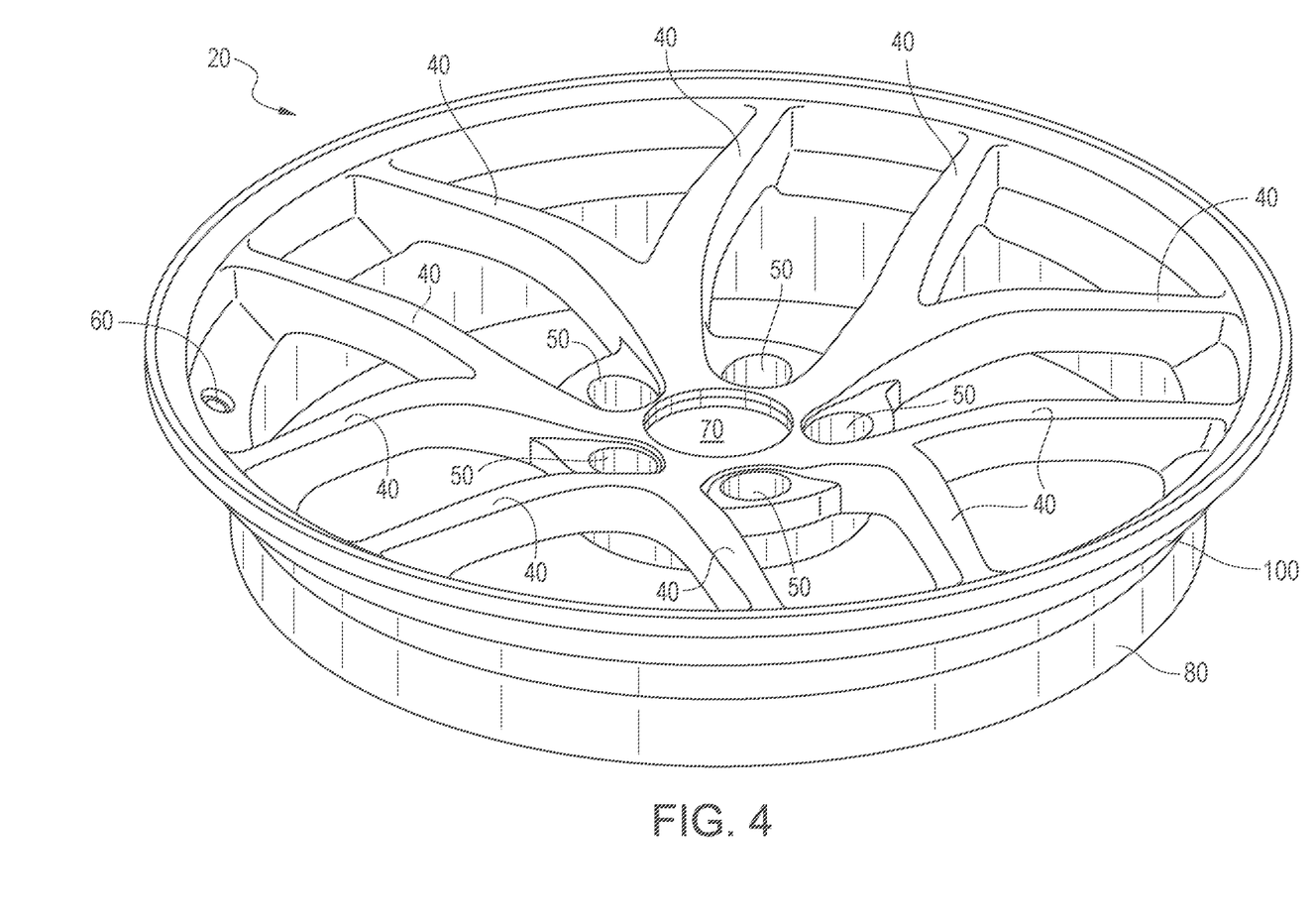
FIG. 4 shows a perspective view of one embodiment of the spoke section of the present disclosure.

FIGS. 4 and 5 show perspective views of the spoke section 20 and the barrel section 30 respectively. FIG. 6 shows a side view/cut away view of the overlap of the opposing mating surfaces 80, 110.

The wheel 10 may be made of many different materials, including composite materials such as carbon fiber. The term "carbon fiber" as used herein includes all fibers which consist essentially of carbon, ranging from graphite fibers to amorphous carbon fibers. Graphite fibers are fibers which consist essentially of carbon and have a predominant X-ray diffraction pattern characteristic of graphite. Amorphous carbon fibers are fibers which consist essentially of carbon and have an essentially amorphous X-ray diffraction pattern. Additionally, the term also includes other high strength, low density materials such as boron, fiber glass or the like or any of the forgoing in a mixture, such as 1-99% carbon fiber mixed with 99-1% fiber glass. For example, the wheel 10 may comprise one or more of the following composite materials a carbon fiber/fiber mixture, carbon fiber or fiber glass. Additionally, additives such as nanoparticles may be added to the composite materials before molding. Additionally, the wheel 10 disclosed herein may not be manufactured from a composite material but rather a metallic material such as aluminum, steel or other alloy. In an embodiment where the wheel 10 is manufactured from a metallic material, the components of the wheel may be forged, cast or machined.

In addition to the composite materials and optionally the nanoparticles, a resin is used to bind the composite materials during molding. In one embodiment, the resin is selected from the group consisting of epoxies, polyurethane, rubber and polyester resins. In a further embodiment the resin is a vinyl ester/polyurethane resin or any other thermoset or thermoplastic polymeric resin or a metallic matrix. In other alternate embodiments, the resin may be selected from the group consisting of butadiene rubber, ethylene-propylene-diene rubber, melamine formaldehyde, natural rubber, phenol-formaldehyde, polyamide, polycarbonate, polypropylene and polytetrafluoroethylene.

The wheel 10 may be constructed using various methods of manufacture including compression molding. In one embodiment, the wheel 10 is constructed using a sheet molding compound (SMC) process or a bulk molding compound (BMC) process.

Although particular embodiments of the present disclosure have been described, it is not intended that such references be construed as limitations upon the scope of this disclosure except as set forth in the claims.

We claim:

1. A two-piece molded wheel comprising a spoke section and a barrel section, wherein the spoke section and barrel sections are joined at a drop center of the wheel, and wherein the barrel section comprises a lip in contact with a most distal surface of a leading edge of a mating surface of the spoke section, wherein a thickness of the barrel section on a first side of the lip is less than a thickness of the barrel section on a second side of the lip, wherein the mating surface of the barrel section is positioned on an interior surface of the barrel section, and wherein a portion of the mating surface of the barrel section overlaps a portion of the mating surface of the spoke section.

2. The wheel of claim 1 wherein the spoke section and barrel sections have complementary mating surfaces and wherein the lip is positioned on an interior side of the mating surface of the barrel section.

3. The wheel of claim 2 further wherein either the spoke section or the barrel section mating surface comprises a plurality of spacers extending therefrom.

4. The wheel of claim 3 wherein the spacers have a height of between 5 and 60 one-thousandth's of an inch.

5. The wheel of claim 3 wherein the barrel section's mating surface comprises the plurality of spacers.

6. The wheel of claim 5 wherein the plurality of spacers has a height of between 5 and 60 one-thousandth's of an inch.

7. The wheel of claim 1 wherein a lap joint joins the spoke section and the barrel section.

8. The wheel of claim 5 wherein a lap joint joins the spoke section and barrel section.

9. The wheel of claim 1 wherein the wheel comprises a composite material.

10. The wheel of claim 8 wherein the wheel comprises a composite material.

11. A two piece-wheel comprising a first section and a second section wherein the wheel comprises areas of varying diameter across a width of the wheel and the first section and second section are joined at an area of the wheel with the smallest diameter, and further wherein the second section comprises a lip in contact with a most distal surface of a leading edge of a mating surface the first section, wherein a radial thickness of the second section on a first side of the lip is less than a radial thickness of the second section on a second side of the lip, wherein the mating surface of the second section is positioned on an interior surface of the second section, and wherein a portion of the mating surface of the second section overlaps a portion of the mating surface of the first section.

12. The wheel of claim 11 wherein the first section and second section have complementary mating surfaces and wherein the lip is positioned on an interior side of the mating surface of the second section.

13. The wheel of claim 12 wherein the second section comprises a plurality of spacers extending therefrom.

14. The wheel of claim 13 wherein the plurality of has a height of between 5 and 60 one-thousandth's of an inch.

15. The wheel of claim 11 wherein a lap joint joins the first section and the second section.

16. The wheel of claim 14 wherein a lap joint joins the first section and second section.

17. The wheel of claim 11 wherein the wheel comprises a composite material.

18. The wheel of claim 14 wherein the wheel comprises a composite material.

19. The wheel of claim 18 further comprising one or more wheel stud apertures and wherein one or more inserts are proximate to the one or more wheel stud apertures.

20. The wheel of claim 11 comprising an integral bead hump.

* * * * *